United States Patent
Pfrommer et al.

(10) Patent No.: US 6,945,480 B2
(45) Date of Patent: Sep. 20, 2005

(54) ELECTROMAGNETICALLY ACTUATED VALVE

(75) Inventors: Ralf Pfrommer, Unterreichenbach (DE); Joerg Heyse, Besigheim (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 10/297,080

(22) PCT Filed: Mar. 27, 2002

(86) PCT No.: PCT/DE02/01129
§ 371 (c)(1),
(2), (4) Date: Apr. 16, 2003

(87) PCT Pub. No.: WO02/079640
PCT Pub. Date: Oct. 10, 2002

(65) Prior Publication Data
US 2003/0150943 A1 Aug. 14, 2003

(30) Foreign Application Priority Data
Mar. 31, 2001 (DE) .................................... 101 16 185

(51) Int. Cl.$^7$ ................................................ B05B 1/30
(52) U.S. Cl. ............................ 239/585.3; 239/585.1; 239/533.11; 239/533.12; 251/129.15
(58) Field of Search .................... 239/585.1, 585.2, 239/585.3, 585.4, 585.5, 533.11, 533.12; 251/129.15, 129.01, 129.16, 129.21

(56) References Cited

U.S. PATENT DOCUMENTS 3,432,106 A   3/1969  Gershon et al.
4,522,371 A   6/1985  Fox et al.
4,678,160 A * 7/1987  Yamada et al. ........ 251/129.02
5,110,087 A * 5/1992  Studtmann et al. .... 251/129.16
5,115,982 A   5/1992  Mesenich
5,178,332 A * 1/1993  Tsukakoshi et al. ........ 239/552

FOREIGN PATENT DOCUMENTS

| DE | 86 14 741  | 10/1987 |
| DE | 39 43 005  | 7/1990  |
| DE | 196 07 288 | 10/1996 |
| DE | 195 23 915 | 1/1997  |
| DE | 199 43 253 | 3/2001  |
| FR | 839 232    | 3/1939  |

* cited by examiner

*Primary Examiner*—Dinh Q. Nguyen
(74) *Attorney, Agent, or Firm*—Kenyon & Kenyon

(57) ABSTRACT

An electromagnetically actuatable valve having a longitudinal valve axis, an electromagnetic circuit, a movable actuating member that cooperates with a fixed valve seat for opening and closing the valve, and an outlet opening that is configured downstream of the valve seat. The actuating member is configured in a bowl, trough, or saucer shape, having an actuating leg and a supporting leg that is configured to be substantially perpendicular to the former. The actuating leg, as a movable part of the actuating member, cooperates with an upper layer of atomization disk to form a sealing valve. The valve may be used as a fuel injector in an internal combustion engine, such as in a mixture-compressing, spark-ignition internal combustion engine.

16 Claims, 1 Drawing Sheet

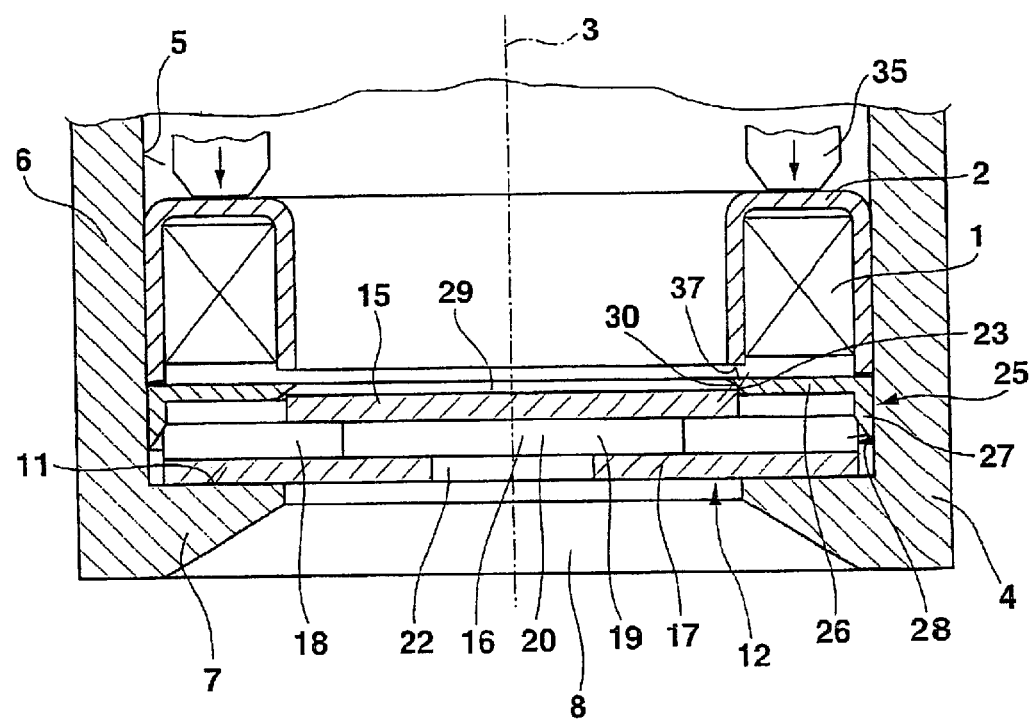

US 6,945,480 B2

ELECTROMAGNETICALLY ACTUATED VALVE

FIELD OF THE INVENTION

The present invention relates to an electromagnetically actuatable valve.

BACKGROUND INFORMATION

German Published Patent Application No. 39 43 005, illustrates an electromagnetically actuatable fuel injector, in which a plurality of disk-shaped elements is arranged in a seat area. When the magnetic circuit is excited, a planar valve plate, acting as a planar armature, is lifted off from a valve seat plate that is situated opposite and cooperates with the valve plate, the two together constituting a plate valve part. A swirl element is arranged upstream of the valve seat plate, which induces a circular rotational motion in the fuel flowing to the valve seat. A stop plate limits the axial path of the valve plate on a side opposite the valve seat plate. The valve plate is enclosed by the swirl element to permit a large amount of movement. In this way, the swirl element provides a guiding function for the valve plate. A plurality of grooves running tangentially is introduced on the lower front side of the swirl element, the grooves extending from the outer periphery to a central swirl chamber. Due to the contact of the swirl element at its lower end face on the valve seat plate, the grooves function as swirl channels.

In the German Published Patent Application No. 196 07 288, a so-called multilayer electroplating process is described in detail for manufacturing perforated disks that are especially well-suited for use in fuel injectors. German Published Patent Application No. 196 07 288 describes a manufacturing principle of producing disks through the single or multiple electroplating metal deposition of various patterns on one another so that a unitary disk is produced. German Published Patent Application No. 195 23 915 illustrates a micro-valve that is manufactured using multilayer electroplating. A valve lower part, which includes at least one armature and one movable valve-closure member, is built up in a plurality of layers through electroplating metal deposition.

SUMMARY OF THE INVENTION

The electromagnetically actuatable valve according to the present invention allows for manufacturing in an especially simple manner such that the valve can be extremely miniaturized. The valve according to the present invention, in the sealing seat area ideally does not have any large storage volumes, which could provide a large dead volume. Rather, the valve seat is directly integrated on an atomization disk, so that there is no additional volume between the valve seat and the intake into the atomization disk. In this way, the quantity of fluid stored in this area is kept extremely small. In a valve that is used as a fuel injector, it is possible to effectively avoid uncontrolled secondary spattering in engine operation.

The actuating member may be configured with two legs, a supporting leg and an actuating leg, the supporting leg running parallel to the longitudinal valve axis, and the actuating leg running substantially perpendicular to the longitudinal valve axis. The actuating member may be manufactured with very small dimensions and, due to the material used, e.g., spring steel sheet, the member may have a very small mass. Due to the small movable mass of the actuating leg as the single movable part, very short switching times of the valve may be achieved, and it is possible to maintain an extremely low level of wear on the sealing seat.

The individual parts of the valve may be assembled very simply. Thus the supporting leg has a wedge-shaped chamfer, for example, on a lower end, for securing the actuating member through a wedging-in process.

BRIEF DESCRIPTION OF THE DRAWINGS

One exemplary embodiment of the present invention is depicted in the drawing in simplified form and is discussed in greater detail in the description below.

FIG. 1 illustrates a partially represented, electromagnetically actuatable valve in a miniaturized configuration.

DETAILED DESCRIPTION

The electromagnetically actuatable valve illustrated as an exemplary embodiment in FIG. 1, by way of example in the form of an injector, is especially well-suited for use in fuel injectors of mixture-compressing, spark-ignition internal combustion engines. The valve according to the present invention may also be used for controlled dispensing of most varying fluids, e.g., as an inhaler, as the nozzle of an ink-jet printer, or as an atomization nozzle in the chemical or pharmaceutical industries.

The valve has a magnetic circuit, which acts as the actuator of the valve. The magnetic circuit includes a solenoid coil 1 and a magnetic holder 2 that surrounds solenoid coil 1 at least partially. Annular magnetic holder 2 surrounds solenoid coil 1, e.g., on three sides and acts as an internal pole of the magnetic circuit. Due to a reversed U-shaped profile, magnetic holder 2 provides for an especially compact and short configuration of the valve in the area of solenoid coil 1.

The very compact magnetic circuit is mounted in a valve housing 4 that is configured to be concentric with a longitudinal valve axis 3. In valve housing 4, a traversing longitudinal opening 5 is provided, which extends along a longitudinal valve axis 3. Valve housing 4 through an longitudinal opening 5 also functions as a fuel intake pipe, longitudinal opening 5 representing a fuel supply channel. Provided in longitudinal opening 5, on the intake side, is, e.g., a fuel filter, which acts to filter out fuel components that, due to their size, could cause blockages or damage in the injector.

Valve housing 4 has, for example, a tubular housing casing 6, in which longitudinal opening 5 extends to have a substantially constant diameter, and a housing base 7, which forms the downstream termination of valve housing 4 and therefore of the entire valve. In housing base 7, an outlet opening 8 is provided, which ultimately represents an extension of longitudinal opening 5, but which has a smaller opening width. The configuration of housing base 7 determines the assembly direction of the interior valve components, which may therefore be inserted only from the supply side in accordance with the so-called ballpoint-pen installation principle.

Placed on interior base 11 of housing base 7 is first, e.g., multilayer atomization disk 12. This atomization disk 12 is built up, for example, in a so-called multilayer electroplating process, a multilayer electroplating metal deposition, and is inserted into the valve as a compact individual component part.

In FIG. 1, a three-layer, i.e., three-level, atomization disk 12 is illustrated functioning as a swirl disk. In the valve according to the present invention, however, other configurations of atomization disks may be used. The layers of atomization disk 12 are deposited one after the other using electroplating, so that each succeeding layer, through electroplating adhesion, bonds firmly to the layer below. Atomization disk 12 has an exterior diameter such that the disk 12 may be fit to longitudinal opening 5 leaving a certain distance. The layers of atomization disk 12 are configured below in accordance with their function as cover layer 15, swirl-generating layer 16, and base layer 17. As illustrated in FIG. 1, upper cover layer 15 is configured to have a smaller exterior diameter than both next layers 16, 17. In this configuration, it is assured that the fuel, when the valve is opened, may flow on the outside past cover layer 15 and therefore may enter unobstructed into exterior intake areas 18 of, for example, four swirl channels 19 emanating from the exterior periphery of atomization disk 12 in the central swirl-generating layer 16.

Upper cover layer 15 represents a closed metallic layer, which does not have any opening areas for through-flow and therefore also functions as valve seat 23. In swirl-generating layer 16, a complex opening contour is provided which extends over the entire axial thickness of this layer 16. The opening contour of central layer 16 is formed by an interior swirl chamber 20 and by a multiplicity of swirl channels 19 that discharge into swirl chamber 20. The, for example, two to eight swirl channels 19 discharge tangentially into swirl chamber 20. While swirl chamber 20 is completely covered by cover layer 15, swirl channels 19 are only partially covered, because the exterior ends that are facing away from swirl chamber 20 form intake areas 18 that are open towards the top. As a result of the tangential discharging of swirl channels 19 into swirl chamber 20, the fuel has a rotational impulse, which it maintains both in a central circular outlet opening 22 in lower base layer 17, as well as in outlet opening 8 of valve housing 4.

Atomization disk 12 is built up in a plurality of metallic layers using electroplating deposition. As a result of the deep-lithographic, electroplating manufacturing process, there are specific features in the contouring, of which several are listed here in summary form:

- layers having a thickness that is constant over the disk surface,
- substantially perpendicular notches in the layers made by the deep-lithographic patterning, the layers each forming hollow spaces that permit through-flow (deviations of approximately 3° with regard to the optimally perpendicular walls can occur for production-engineering reasons),
- desired undercuts and overlaps of the notches as a result of the multilayer design of individually patterned metal layers,
- notches having any cross-sectional shapes that have essentially axis-parallel walls,
- a one-piece design of the atomization disk, because the individual metal depositions are carried out directly one on top of the other.

At an upper limiting edge, atomization disk 12 forms a valve seat 23 at cover layer 15. As a valve member that opens and closes the valve, an actuating member 25 is provided that is bowl-, trough-, or saucer-shaped. Actuating member 25, functioning both as armature as well as valve-closure member, cooperates with valve seat 23 as a sealing valve. Actuating member 25, which has an L-shaped cross-section, has two legs, one, an actuating leg 26, being oriented so as to be substantially perpendicular to longitudinal valve axis 3, and the other, an annular supporting leg 27, being oriented parallel to longitudinal valve axis 3, the legs therefore extending so as to constitute a substantially perpendicular bend with regard to each other.

After the assembly of atomization disk 12, actuating member 25 is inserted into longitudinal opening 5. Supporting leg 27 at a lower end has a wedge-shaped chamfer 28, which is pressed between the inner wall of valve housing 4 and atomization disk 12, so that it is wedged in at central swirl-producing layer 16. Because this occurs over an entire periphery of atomization disk 12, atomization disk 12 is fixed at the valve end in a secure, reliable, and centered manner.

Actuating leg 26 is also configured in an annular shape, because the leg 26 has an interior cutout 29. Edge area 30 of cutout 29 extends in the flow direction to expand in a truncated-cone shape, wherein the edge area 30 forms the actual valve-closure element, which corresponds with valve seat 23 on cover layer 15. When the valve is closed, actuating leg 26 of actuating member 25 contacts valve seat 23. The pressure force with which actuating member 25 presses onto valve seat 23 results from the spring stiffness of the material that is used in actuating member 25 (e.g., spring steel sheet) and from the resting pressure of the fuel exerted thereon.

Solenoid coil 1 is preassembled in magnetic holder 2, and subsequently this magnetic circuit assembly is also inserted into longitudinal opening 5. A radial excess in the exterior diameter of magnetic holder 2 provides for desired axial fixing as a result of the radial pressure in valve housing 4.

To release the through-flow in the area of valve seat 23, actuating member 25, at edge area 30 of actuating leg 26, must lift off from atomization disk 12 by a defined stroke. To facilitate the stroke, the actuation of the valve takes place electromagnetically. The opening stroke is set by the plastic deformation of magnetic holder 2 in an already assembled state. For this purpose, it is possible to exert pressure axially on magnetic holder 2 using, for example, a deformation tool 35 that is only sketched in. The spring force of actuating member 25 is set in advance in the axial direction also through plastic deformation.

The stroke of actuating member 25 is therefore determined, inter alia, by the installation positions of actuating member 25 and magnetic holder 2. The one end position of actuating member 25, when solenoid coil 1 is not excited, is determined by the position of actuating leg 26 on valve seat 23, whereas the other end position of actuating member 25, when solenoid coil 1 is excited, results from the position of actuating leg 26 on interior downstream end face 37 of magnetic holder 2, which serves as the interior pole.

The compact configuration of the individual components of the valve allows the manufacture of a miniaturized valve having an external diameter of only roughly 4 mm.

What is claimed is:

1. An electromagnetically actuatable valve having a longitudinal valve axis, the valve comprising:
   an electromagnetic circuit;
   a fixed valve seat;
   a movable actuating member which cooperates with the fixed valve seat to open and close the valve; and
   a structure including an outlet opening configured downstream of the valve seat, wherein;
      the movable actuating member includes one of a bowl shape, a trough shape, and a saucer shape,
      the movable actuable member has an actuating leg and a supporting leg that is substantially perpendicular to the actuating leg, and the actuating leg forms a valve closing element that interacts directly with the valve seat for opening and closing the valve.

2. The valve according to claim 1, wherein the supporting leg extends parallel to the longitudinal valve axis, and the actuating leg extends substantially perpendicular to the longitudinal valve axis.

3. The valve according to claim 1, wherein only the actuating leg forms a movable part of the movable actuating member.

4. The valve according to claim 1, wherein the supporting leg extends in an annular configuration, and the actuating leg extends in the annular configuration as a result of an interior cutout.

5. The valve according to claim 4, wherein the actuating leg, at an edge area of the interior cutout, forms a valve-closure member.

6. An electromagnetically actuatable valve having a longitudinal valve axis, the valve comprising:
   an electromagnetic circuit;
   a fixed valve seat;
   a movable actuating member which cooperates with the fixed valve seat to open and close the valve; and
   a structure including an outlet opening configured downstream of the valve seat, wherein:
      the movable actuating member includes one of a bowl shape, a trough shape, and a saucer shape,
      the movable actuable member has an actuating leg and a supporting leg that is substantially perpendicular to the actuating leg,
      the supporting leg extends in an annular configuration, and the actuating leg extends in the annular configuration as a result of an interior cutout,
      the actuating leg, at an edge area of the interior cutout, forms a valve-closure member, and
      the edge area of the interior cutout extends in a flow direction to expand in a truncated-cone shape.

7. An electromagnetically actuatable valve having a longitudinal valve axis, the valve comprising:
   an electromagnetic circuit;
   a fixed valve seat;
   a movable actuating member which cooperates with the fixed valve seat to open and close the valve; and
   a structure including an outlet opening configured downstream of the valve seat, wherein:
      the movable actuating member includes one of a bowl shape, a trough shape, and a saucer shape,
      the movable actuable member has an actuating leg and a supporting leg that is substantially perpendicular to the actuating leg, and
      the supporting leg at a lower end thereof has a wedge-shaped chamfer for securing the movable actuating member.

8. An electromagnetically actuatable valve having a longitudinal valve axis, the valve comprising:
   an electromagnetic circuit;
   a fixed valve seat;
   a movable actuating member which cooperates with the fixed valve seat to open and close the valve;
   a structure including an outlet opening configured downstream of the valve seat; and
   a multilayer atomization disk arranged upstream of the outlet opening, wherein:
      the movable actuating member includes one of a bowl shape, a trough shape, and a saucer share, and
      the movable actuable member has an actuating leg and a supporting leg that is substantially perpendicular to the actuating leg.

9. The valve according to claim 8, wherein an upper layer of the atomization disk includes the valve seat, with which the actuating leg cooperates, to open and close the valve.

10. The valve according to claim 8, further comprising:
    a valve housing, wherein the supporting leg is wedged between the valve housing and a layer of the atomization disk that is located downstream of an upper layer of the atomization disk.

11. The valve according to claim 9, further comprising:
    a valve housing, wherein the supporting leg is wedged between the valve housing and a further layer of the atomization disk that is located downstream of the upper layer.

12. The valve according to claim 8, wherein the atomization disk is configured as a swirl disk having at least one swirl channel.

13. The valve according to claim 8, wherein the atomization disk comprises a plurality of layers, the layers configured through electroplating metal deposition.

14. An electromagnetically actuatable valve having a longitudinal valve axis, the valve comprising:
    an electromagnetic circuit;
    a fixed valve seat;
    a movable actuating member which cooperates with the fixed valve seat to open and close the valve; and
    a structure including an outlet opening configured downstream of the valve seat, wherein:
       the movable actuating member includes one of a bowl shape, a trough shape, and a saucer shape,
       the movable actuable member has an actuating leg and a supporting leg that is substantially perpendicular to the actuating leg, and
       the electromagnetic circuit includes a solenoid coil and a magnetic holder, the magnetic holder having an annular shape and a U profile, and the solenoid coil being arranged within the U profile.

15. The valve according to claim 14, wherein an opening stroke of the movable actuating member is set through a plastic deformation of the magnetic holder.

16. A method of injecting fuel in a mixture-compressing, spark-ignition internal combustion engine, comprising:
    providing a quantity of the fuel; and
    injecting fuel from an electromagnetically actuatable valve having a longitudinal axis, the valve including:
       an electromagnetic circuit;
       a fixed valve seat;
       a movable actuating member which cooperates with the fixed valve seat to open and close the valve; and
       a structure including an outlet opening configured downstream of the valve seat, wherein the movable actuating member includes one of a bowl shape, a trough shape, and a saucer shape, the movable actuating member includes an actuating leg and a supporting leg that is configured to be substantially perpendicular to the actuating leg, and the actuating leg forms a valve closing element that interacts directly with the valve seat for opening and closing the valve.

* * * * *